United States Patent
Lam et al.

(10) Patent No.: US 8,260,787 B2
(45) Date of Patent: Sep. 4, 2012

(54) RECOMMENDATION SYSTEM WITH MULTIPLE INTEGRATED RECOMMENDERS

(75) Inventors: Shing Yan Lam, Seattle, WA (US); Kushal Chakrabarti, Kirkland, WA (US); George M. Ionkov, Seattle, WA (US); Sung H. Kim, Sammamish, WA (US); Brett W. Witt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 370 days.

(21) Appl. No.: 11/771,914

(22) Filed: Jun. 29, 2007

(65) Prior Publication Data

US 2009/0006398 A1    Jan. 1, 2009

(51) Int. Cl.
*G06F 17/30* (2006.01)
*G06F 7/00* (2006.01)

(52) U.S. Cl. .................. 707/748; 707/706; 707/723

(58) Field of Classification Search .................. None
See application file for complete search history.

(56) References Cited

U.S. PATENT DOCUMENTS

| | | | |
|---|---|---|---|
| 5,749,081 A | | 5/1998 | Whiteis |
| 5,815,665 A | | 9/1998 | Teper et al. |
| 6,014,664 A | * | 1/2000 | Fagin et al. ............... 707/5 |
| 6,029,141 A | | 2/2000 | Bezos et al. |
| 6,134,532 A | | 10/2000 | Lazarus et al. |
| 6,182,050 B1 | * | 1/2001 | Ballard ............... 705/14 |
| 6,282,548 B1 | | 8/2001 | Burner et al. |
| 6,317,722 B1 | | 11/2001 | Jacobi et al. |
| 6,438,579 B1 | | 8/2002 | Hosken |
| 6,442,542 B1 | | 8/2002 | Ramani et al. |
| 6,460,036 B1 | | 10/2002 | Herz |
| 6,493,702 B1 | | 12/2002 | Adar et al. |
| 6,535,888 B1 | | 3/2003 | Vijayan et al. |
| 6,598,026 B1 | | 7/2003 | Ojha et al. |
| 6,601,075 B1 | | 7/2003 | Huang et al. |
| 6,611,814 B1 | | 8/2003 | Lee et al. |

(Continued)

FOREIGN PATENT DOCUMENTS

WO   WO 01/15002 A2   3/2001

(Continued)

OTHER PUBLICATIONS

Das et al., Google News Personalization: Scalable Online Collaborative Filtering, WWW 2007/Track: Industrial Practice and Experience, May 9-12, 2007, (271-280), Banff, Alberta, Canada.*

(Continued)

*Primary Examiner* — Hosain Alam
*Assistant Examiner* — Sangwoo Ahn
(74) *Attorney, Agent, or Firm* — Knobbe Martens Olson & Bear LLP

(57) ABSTRACT

A recommendations system is provided in various embodiments for selecting items to recommend to a user. The system includes a recommendation engine with a plurality of recommenders, and each recommender identifies a different type of reason for recommending items. In one embodiment, each recommender retrieves item preference data and generates candidate recommendations responsive to a subset of that data. The recommenders also score the candidate recommendations. In certain embodiments, a normalization engine normalizes the scores of the candidate recommendations provided by each recommender. A candidate selector selects at least a portion of the candidate recommendations based on the normalized scores to provide as recommendations to the user. The candidate selector also outputs the recommendations with associated reasons for recommending the items.

10 Claims, 7 Drawing Sheets

U.S. PATENT DOCUMENTS

| | | |
|---|---|---|
| 6,618,727 B1 | 9/2003 | Wheeler et al. |
| 6,691,163 B1 | 2/2004 | Tufts |
| 6,704,727 B1 * | 3/2004 | Kravets .................... 707/5 |
| 6,853,982 B2 | 2/2005 | Smith et al. |
| 6,865,573 B1 | 3/2005 | Hornick et al. |
| 6,873,985 B2 | 3/2005 | Newman |
| 6,889,250 B2 | 5/2005 | Bezos et al. |
| 6,912,505 B2 | 6/2005 | Linden et al. |
| 6,981,040 B1 | 12/2005 | Konig et al. |
| 7,003,515 B1 | 2/2006 | Glaser et al. |
| 7,007,006 B2 | 2/2006 | Zilio et al. |
| 7,092,941 B1 | 8/2006 | Campos |
| 7,114,170 B2 | 9/2006 | Harris et al. |
| 7,152,061 B2 | 12/2006 | Curtis et al. |
| 7,310,612 B2 | 12/2007 | McQueen, III et al. |
| 7,548,914 B2 | 6/2009 | Bell et al. |
| 7,590,562 B2 | 9/2009 | Stoppelman |
| 7,594,189 B1 | 9/2009 | Walker et al. |
| 7,765,130 B2 | 7/2010 | McQueen, III et al. |
| 7,840,980 B2 * | 11/2010 | Gutta ......................... 725/46 |
| 2001/0014868 A1 | 8/2001 | Herz et al. |
| 2002/0010625 A1 | 1/2002 | Smith et al. |
| 2002/0059092 A1 | 5/2002 | Naito et al. |
| 2002/0087515 A1 * | 7/2002 | Swannack et al. ............ 707/2 |
| 2002/0116310 A1 * | 8/2002 | Cohen et al. ................ 705/36 |
| 2002/0128959 A1 | 9/2002 | Kostic et al. |
| 2002/0138354 A1 | 9/2002 | Seal et al. |
| 2002/0184139 A1 | 12/2002 | Chickering et al. |
| 2002/0198882 A1 | 12/2002 | Linden et al. |
| 2003/0105682 A1 | 6/2003 | Dicker et al. |
| 2003/0126235 A1 | 7/2003 | Chandasekar et al. |
| 2003/0126606 A1 * | 7/2003 | Buczak et al. ............... 725/46 |
| 2003/0172357 A1 | 9/2003 | Kao et al. |
| 2003/0233422 A1 | 12/2003 | Csaszar et al. |
| 2004/0034652 A1 | 2/2004 | Hofmann et al. |
| 2004/0093321 A1 | 5/2004 | Roustant et al. |
| 2004/0103186 A1 | 5/2004 | Casati et al. |
| 2004/0236611 A1 * | 11/2004 | Bonissone et al. ............ 705/4 |
| 2005/0004880 A1 | 1/2005 | Musgrove et al. |
| 2005/0033657 A1 | 2/2005 | Herrington et al. |
| 2005/0038717 A1 | 2/2005 | McQueen, III et al. |
| 2005/0038819 A1 | 2/2005 | Hicken et al. |
| 2005/0071251 A1 * | 3/2005 | Linden et al. ............... 705/26 |
| 2005/0091245 A1 | 4/2005 | Chickering et al. |
| 2005/0171861 A1 | 8/2005 | Bezos et al. |
| 2005/0216516 A1 * | 9/2005 | Calistri-Yeh et al. ...... 707/104.1 |
| 2005/0234952 A1 | 10/2005 | Zeng et al. |
| 2005/0256866 A1 | 11/2005 | Lu et al. |
| 2005/0256867 A1 | 11/2005 | Walther et al. |
| 2006/0031211 A1 * | 2/2006 | Mizuno ........................ 707/3 |
| 2006/0106665 A1 | 5/2006 | Kumar et al. |
| 2006/0184566 A1 | 8/2006 | Lo et al. |
| 2006/0206478 A1 | 9/2006 | Glaser et al. |
| 2006/0212442 A1 | 9/2006 | Conrad et al. |
| 2006/0212444 A1 | 9/2006 | Handman et al. |
| 2006/0242139 A1 | 10/2006 | Butterfield et al. |
| 2007/0005437 A1 | 1/2007 | Stoppelman |
| 2007/0011203 A1 | 1/2007 | Tsunoda |
| 2007/0016575 A1 | 1/2007 | Hurst-Hiller et al. |
| 2007/0032244 A1 | 2/2007 | Counts et al. |
| 2007/0043688 A1 | 2/2007 | Kountz et al. |
| 2007/0067217 A1 | 3/2007 | Schachter et al. |
| 2007/0078832 A1 | 4/2007 | Ott, IV et al. |
| 2008/0005064 A1 | 1/2008 | Sarukkai |
| 2008/0040301 A1 | 2/2008 | Sadagopan et al. |
| 2008/0040313 A1 | 2/2008 | Schachter |
| 2008/0133417 A1 * | 6/2008 | Robinson ..................... 705/52 |
| 2008/0243631 A1 | 10/2008 | Kane et al. |
| 2008/0243632 A1 | 10/2008 | Kane et al. |
| 2008/0255934 A1 | 10/2008 | Leventhal et al. |
| 2009/0006373 A1 | 1/2009 | Chakrabarti et al. |
| 2009/0006374 A1 | 1/2009 | Kim et al. |
| 2009/0006398 A1 | 1/2009 | Lam et al. |
| 2009/0138326 A1 | 5/2009 | Shi |
| 2010/0191619 A1 | 7/2010 | Dicker et al. |
| 2010/0306194 A1 | 12/2010 | Evans |

FOREIGN PATENT DOCUMENTS

| | | |
|---|---|---|
| WO | WO 01/25947 | 4/2001 |
| WO | WO 02/19203 | 3/2002 |
| WO | WO 2008/121737 | 10/2008 |

OTHER PUBLICATIONS

Abhinandan Das; Mayur Datar; Shyam Rajaram; Ashutosh Garg; Google News Personalization: Scalable Online Collaborative Filtering, WWW 2007/Track: Industrial Practice and Experience, May 8-12, 2007, (271-280), Banff, Alberta, Canada.

Filing Receipt, Specification and Drawings of related pending U.S. Appl. No. 11/772,010, filed Jun. 29, 2007. Title: Recommendation System With Multiple Integrated Recommenders. Inventors: Kushal Chakrabarti, et al.

Filing Receipt, Specification and Drawings of related pending U.S. Appl. No. 11/772,013, filed Jun. 29, 2007. Title: Recommendation System With Multiple Integrated Recommenders. Inventors: Sung H. Kim, et al.

"Just Add People—Collaborative filtering brings human input to information retrieval in the enterprise," Journal ISSN: 8750-6874, Information Week, p. 65, Dec. 22, 1997.

"Swik" [online], [archived at Archive.org on Jul. 8, 2005], Retrieved from Internet: <URL: http://swik.net/about > 3 pages.

Adam Mathes, "Folksonomies—Cooperative Classification and Communication Through Shared Metadata" [online], Dec. 2004, Retrieved from Internet: URL: http://www.adammathes.com/academic/computer-mediated-communication/folksonomies.html > 18 pages.

J. Rucker, et al., "Siteseer: Personalized Navigation for the Web," Communications of the ACM, Mar. 1997, vol. 40, No. 3, pp. 73-75.

J. Udell, "Collaborative Knowledge Gardening," InfoWorld.com article, dated Aug. 20, 2004, pp. 1-4.

Luigi Canali De Rossi, "Grassroots Cooperative Categorization of Digital Contents Assets: Folksonomies, What They Are, Why They Work" [online], Jan. 5, 2005. Retrieved From Internet: <URL: http://www.masternewmedia.org/2005/01/05/ rassroots_cooperative_categorization_of_digital.htm> 12 pages.

M. Eirinaki, et al., "SEWeP: Using Site Semantics and a Taxonomy to Enhance the Web Personalization Process," SIGKDD'03, ACM 1-58113-737-0/03/0008, Aug. 24-27, 2003, pp. 99-108.

M. Roscheisen et al., "Beyond browsing: shared comments, SOAPs, trails, and on-line communities," Computer Networks and ISDN Systems 27 (1995), pp. 739-749.

Roland Piquepaille, How do you use del.icio.us?, Published on Nov. 8, 2004, Archive.org on Nov. 10, 2004, Roland Piquepaille's Technology Trends, pp. 1-4.

T. Hammond, et al., "Social Bookmarking Tools (I)," D-Lib Magazine, ISSN 1082-9873, Apr. 2005, vol. II, No. 4, pp. 1-23.

Das et al., Google News Personalization: Scalable Online Collaborative Filtering, WWW 2007/Track: Industrial Practice and Experience, May 8-12, 2007, (271-280), Banff, Alberta, Canada.

Blog posting titled "Loomia: a product-recommendation Web service," Alpha Blog, Alpha.cnet.com, dated Jul. 10, 2006 posted by Andrew Gruen, printed form http://reviews.cnet.com/4531-10921_7-6550327.html.

Ellenberg, "The Netflix Challenge." Wired, Mar. 16, 2008, p. 114-122.

Schonfeld, "The Great Giveaway," article in Business 2.0 Magazine dated Apr. 1, 2005.

Filing Receipt, Specification and Drawings of related pending U.S. Appl. No. 11/281,886, filed Nov. 17, 2005. Title: Recommendations based on item tagging activities of users. Inventors: Aaron Donsbach, et al.

Four web pages printed from www.newsmonster.org site on Aug. 8, 2003; namely web pages at www.newsmonster.org/profile.html (3 printed pages), www.newsmonster.org/reputation.html (1printed page); www.newsmonster.org/intro-Sortby Reputation.html (1printed page), and www.newsmonster.org/feature-breakdown.html (2 printed pages).

Cingil, et al. "A Broader Approach to Personalization," Communications of the ACM, vol. 43, No. 8, dated Aug. 2000, pp. 136-141.

International Search Report and Written Opinion in counterpart PCT application PCT/US 08/58516.

International Search Report and Written Opinion in counterpart PCT application PCT/US 08/67404.

Mills, CNET News article titled "Google book scanning still on hold," dated Nov. 4, 2005, printed from www.news.com.

Press release titled "Aggregate Knowledge Delivers Relevance and Increases Revenue for Retail and Media Sites," dated Mar. 7, 2006.

Press release titled "Aggregate Knowledge Unveils the Internet's First Discovery Service," dated Jan. 30, 2007.

Resnick et al., "GroupLens: An Open Architecture for Collaborative Filtering of Netnews," Proceedings of ACM 1994 Conference on Computer Supported Cooperative Work, pp. 175-186 (1994).

Riggs et al., "An Algorithm for Automated Rating of Reviewers,"International Conference on Digital Libraries, Proceedings of the First ACM/IEEE-CS Joint Conference on Digital Libraries, pp. 381-387 (2001).

Roscheisen et al., "Beyond Browsing: Shared Comments, SOAPS, Trails and On-Line Communities," Proceedings of the Third International World-Wide Web Conference, Computer Networks and ISDN Systems 27, pp. 739-749, dated Apr. 10-14, 1995.

Searls et al., "Building with Blogs," Linux Journal, vol. 2003, Issue 107, p. 4, dated Mar. 2003.

U.S. Appl. No. 10/864,288, filed Jun. 9, 2004 (application text, drawings, and filing receipt provided).

U.S. Appl. No. 11/227,891, filed Mar. 29, 2006 (application, text, drawings, and filing receipt provided).

U.S. Appl. No. 11/758,932, filed Jun. 6, 2007 (application, text, drawings, and filing receipt provided).

O'Reilly Press Room, "Amazon Hacks": Tips and Tools for Tapping into Amazon's Power, http://press.oreilly.com/lpt/pr/1089, 3 pages, (Aug. 20, 2003).

\* cited by examiner

RECOMMENDATION SYSTEM WITH MULTIPLE INTEGRATED RECOMMENDERS

BACKGROUND

Description of the Related Technology

Web sites and other types of interactive systems commonly include recommendation systems for providing personalized recommendations of items stored or represented in a data repository. The recommendations are typically generated based on monitored user activities or behaviors, such as item purchases, item viewing events, item rentals, and/or other types of item selection actions. In some systems, the recommendations are additionally or alternatively based on users' explicit ratings of items.

Traditional collaborative recommendations processes operate by attempting to match users to other users having similar behaviors or interests. For example, once Users A and B have been matched, items favorably sampled by User A but not yet sampled by User B may be recommended to User B. In contrast, content-based recommendation systems seek to identify items having content (e.g., text) that is similar to the content of items selected by the user.

Other recommendation systems use item-to-item similarity mappings to generate the personalized recommendations. The item-to-item mappings may be generated periodically based on computer-detected correlations between the item purchases, item viewing events, or other types of item selection actions of a population of users. Once generated, a dataset of item-to-item mappings may be used to identify and recommend items similar to those already "known" to be of interest to the user.

BRIEF DESCRIPTION OF THE DRAWINGS

Specific embodiments will now be described with reference to the drawings, which are intended to illustrate and not limit the various features of the inventions.

DETAILED DESCRIPTION OF SOME EMBODIMENTS

Several different computer-implemented processes will now be described for using recommendation algorithms to improve item recommendations provided to users. These processes may be embodied individually or in any combination in a multi-user computer system ("system") that implements a recommendation system.

For purposes of illustration, the processes are described primarily in the context of a system that recommends catalog items to users of an e-commerce web site that provides functionality for users to browse and make purchases from an electronic catalog of items. As will be apparent, however, the disclosed processes can also be used in other types of systems, and can be used to recommend other types of items, such as but not limited to web sites, news articles, blogs, podcasts, travel destinations, service providers, other users, events, discussion boards, photos and other images, videos, tagged items, and user-generated lists of items. In addition, the disclosed processes need not be implemented as part of, or in conjunction with, a web site.

A significant deficiency in existing recommendation systems, including but not limited to recommendation systems of the types described above, is that they typically use a single, monolithic algorithm for generating recommendations. These algorithms are often inflexible and not easily adapted to producing recommendations targeted at different customer wants or needs. For example, a recommendation algorithm might recommend items because they are similar to an item the customer purchased. However, on a given day the customer might be interested in shopping for a friend's birthday or exploring new interests rather than buying items similar to what the customer already owns.

Currently available recommendation systems also fail to provide reasons for recommending items. Customers may not trust the recommendations provided by these systems because they may think that the recommendations are generated by a computer or marketing department that does not understand the customers' needs. This lack of trust can cause customers to ignore their recommendations.

Figure 1:
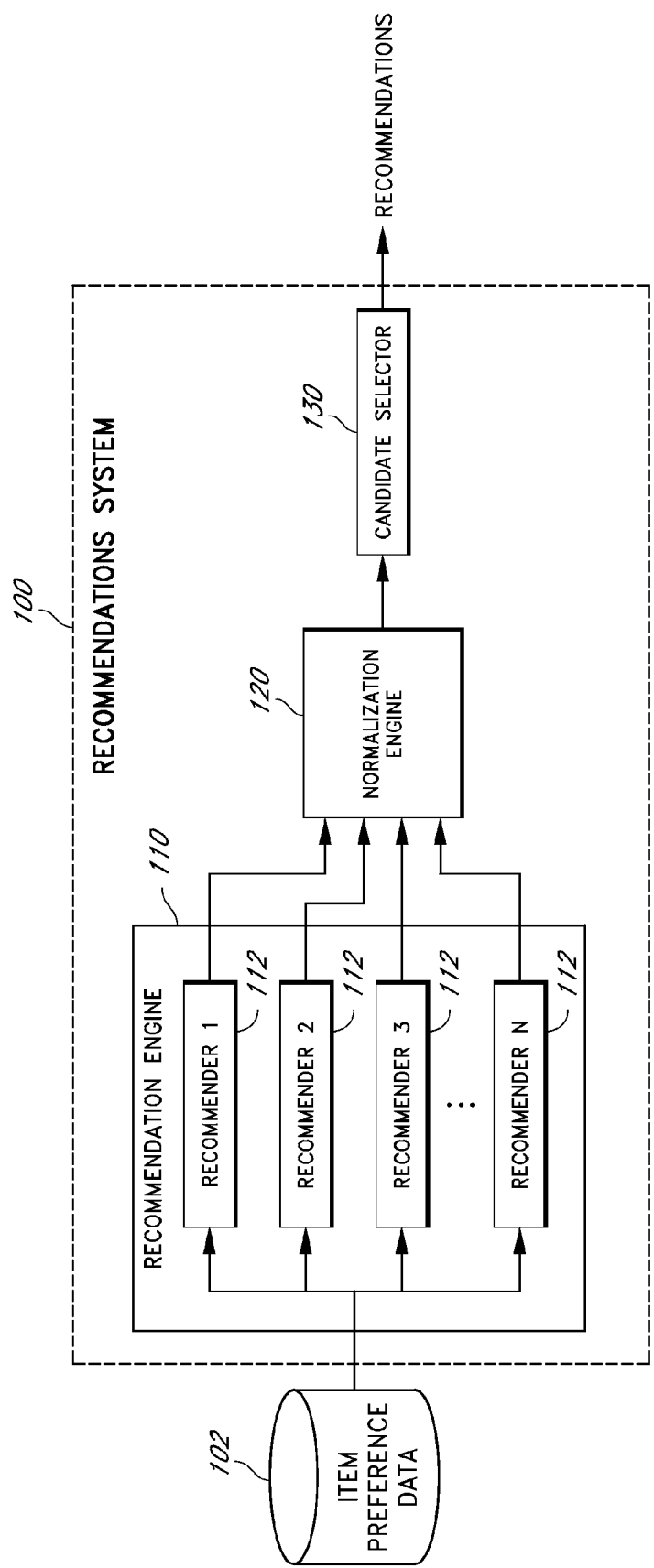
FIG. 1 illustrates an embodiment of a recommendation system.

Turning to FIG. 1, an embodiment of a recommendation system 100 is shown that addresses the foregoing problems, among others. The recommendation system 100 includes multiple recommenders 112 for generating recommendations that target users' varied interests. The recommenders 112 provide reasons for recommending items that can be more compelling than reasons provided by other systems, thereby increasing consumer confidence in the recommendations.

The various components of the recommendation system 100 may be implemented as software applications, modules, or components on one or more computers, such as servers. While the various components are illustrated separately, they may share some or all of the same underlying logic or code.

The recommendation system 100 receives item preference data 102 and uses the item preference data 102 to produce personalized item recommendations for a target user. In an embodiment, the item preference data 102 is reflective of actions performed by the user. These actions might include, for example, purchasing items, rating items, adding items to the user's wish list, providing data on the user's friends, tagging items, searching for items, and the like. The item preference data 102 may include browse history data, purchase history data, friends data, tags data, and many other types of data. Some forms of item preference data 102 and their uses will be described more fully below.

The item preference data 102 is provided to a recommendation engine 110. The recommendation engine 110 includes multiple recommenders 112. In an embodiment, each recommender 112 may be implemented as a component or algorithm that generates personalized item recommendations targeted to a different interest or need of a user. The multiple recommenders 112 of the recommendation engine 110 can provide more effective recommendations than the monolithic algorithms of currently-available systems.

In an embodiment, each recommender 112 analyzes a subset of the item preference data to identify items as candidate recommendations for recommending to a user. Each recommender 112 also identifies one or more reasons for recommending the items. As discussed below, different recommenders 112 may use different types of item preference data than others to select candidate items to recommend. Different recommenders 112 may also provide different types of reasons for recommending items.

For example, a particular recommender 112 might retrieve the user's purchase history data. Using this data, the recommender 112 can find items owned by the user that are part of a series. A series might include, for instance, books in a trilogy, movies and their sequels, or all albums by a musician. If the user has purchased fewer than all the items in the series, the recommender 112 might select the remaining items as candidate recommendations and provide a reason such as, "this item is recommended because you purchased items A and B, and this item would complete your series." Advantageously, this reason can be more compelling than a reason such as "because you purchased items A and B, and this item is similar." Users may therefore be more inclined to trust the reasons provided by the recommenders 112.

As another example, a recommender 112 might obtain data about a user's friends. This friends data might include information on the friends' birthdays, their wish lists, and their purchase histories. Using this data, a recommender 112 might suggest gifts that could be bought for a friend's upcoming birthday and provide a reason such as "this item is recommended because your friend John's birthday is on July 5th, and this item is on his wish list." Provided with such a reason, the user might be more inclined to buy the item.

Many other examples of item preference data 102 may be used by the recommenders 112 to generate candidate recommendations and corresponding reasons. For instance, browse history data (e.g., data on user searches, clicks, and the like) may be used to provide a recommendation with the reason, "because this item is similar to an item you searched for." Purchase history data and/or wish list data might be used to provide a recommendation with the reason, "because this item might be interesting to an early adopter such as you." Browse history data on a browse node of interest to the user (e.g., a category browsed by the user) might be used to provide a recommendation with the reason, "because this item is a top seller in one of your favorite interest areas." Various other forms of item preference data 102 may be used to provide recommendations with reasons such as "because you recently moved," "because you bought an item that may need replacing," "because most people upgrade their DVD player after two years," or the like.

Multiple reasons may be provided by a single recommender 112, or multiple recommenders 112 may each provide the same candidate recommendation along with a different reason for that recommendation. For instance, several recommenders 112 may be used to recommend a particular war movie because 1) a user recently rated several war movies, 2) this is the best selling movie in the war movie category, and 3) this movie was nominated for two Academy Awards. Using multiple reasons may provide further motivation to the user to view or buy an item.

However, in certain embodiments, fewer reasons are shown to the user even when multiple reasons are available, to reduce possible information overload. In the above war movie example, the user might therefore only see the reason "because this is the best selling movie in the war movie category." This reason is focused and highly targeted to the user's interest of buying war movies and may be more effective than the multiple reasons provided above.

The user may also see greater diversity in the reasons that are provided. For example, the user may see one recommendation that is based on an item the user purchased, another based on one or more search queries submitted by the user, and another based on an item listed on a friend's wish list. The diversity of recommendations and reasons provided to the user may heighten user interest in the recommendations.

Advantageously, in one implementation, at least some of the recommenders 112 are modular. Recommenders 112 can therefore be selectively added to or removed from the recommendation engine 110. As more diverse items or services are added to an online catalog, for instance, new recommenders 112 can be added that target different user interests. Conversely, some recommenders 112 may be removed from the recommendation engine 110 if they become less useful.

Some of the recommenders 112 may use particular types of behavior-based associations to select candidate items to recommend. As one example, one recommender may use purchase-based item associations, as generated by mining the purchase histories of large numbers of users, to select candidate items similar to those purchased or owned by the target user. As another example, a particular recommender may use item-viewing based associations, as generated by mining the item viewing histories of large numbers of users, to select candidate items similar to those recently viewed by the target user. Another recommender may use behavior-based associations between particular search queries and items to select candidate items that are related to the search history of the target user. Other recommenders may select candidate items that are unusually popular in the particular geographic region of the target user, or that are unusually popular among users whose email addresses contain the same domain name (e.g., nasa.gov) as the target user. Examples of recommendation methods that use these approaches are described in the following U.S. patent documents, the disclosures of which are hereby incorporated by reference in their entirety: U.S. Pat. Nos. 6,853,982 and 6,963,850, and U.S. application Ser. No. 10/966,827, filed Oct. 15, 2004. In addition, because the recommenders 112 are modular, the recommenders 112 can be added to an existing recommendation system to improve the quality of recommendations provided by the system.

The recommenders 112 in certain implementations score the candidate recommendations. The scores can provide indications of the relative strength of the candidate recommendations. Each recommender uses one or more factors to generate the scores. As one example, a recommender 112 that provides recommendations to complete series of items owned by the user might base scores on the total number of items in a series, the number of those items owned by the user, and the sales rank of the items not owned by the user.

One or more of the recommenders 112 may further take into account negative feedback provided by a user when generating and scoring candidate recommendations, as described in related U.S. patent application Ser. No. 11/752,251, filed May 22, 2007, and titled "Probabilistic Recommendation System," the disclosure of which is hereby incorporated by reference in its entirety. Negative feedback may be used for items the user has explicitly rated poorly, such as by designating as "not interested" or by rating two stars or less on a scale of 1-5 stars (see FIG. 7). Other types of negative feedback, including implicit negative feedback, may be used to score candidate recommendations. In an embodiment, negative feedback can cause a candidate recommendation to receive a negative score. A candidate recommendation may also have an overall score that is the sum of both positive scores and negative scores.

The scores provided by each recommender 112 may be based on factors that might be pertinent to one recommender 112 but not another. For instance, recommendations for top sellers in a browse node of interest to the user might score items based on their relative sales ranking. However, relative sales ranking might not be relevant to recommendations for items an early adopter might buy since there may be little sales data for these items.

Since the candidate recommendations from each recommender 112 may be based on different criteria, the resulting scores from each recommender 112 can have different scoring scales. One recommender 112 might output, for example, scores in a range of −10,000 to 10,000, whereas another recommender 112 might output scores in a range of 90 to 120. It can be difficult to compare scores from these different score ranges. Moreover, even if the score ranges of different recommenders 112 overlap, the same score outputted by different recommenders may have different meanings because the underlying scoring methodologies may be different. For instance, a score of "2" from one recommender that has a scoring scale of 0 to 100 may have a different meaning than a score of "2" from a recommender that has a scoring scale of 1 to 5.

Accordingly, in certain embodiments a normalization engine 120 normalizes the scores from the various recommenders 112 to produce normalized scores. The normalized scores enable the candidate recommendations generated by each recommender 112 to be more easily compared. Many different algorithms may be used to normalize the scores. A few example embodiments of these algorithms are described below, with respect to FIGS. 4 through 6.

Advantageously, the normalization engine 120 facilitates adding or removing modular recommenders 112 to the recommendation engine 110. The normalization engine 120 facilitates this by normalizing scores from any recommender 112 added to the recommendation engine 110. Consequently, recommenders 112 may be added that use different scoring scales from the other recommenders 112. In addition, the normalization engine 130 facilitates removing recommenders 112 from the recommendation engine 110 because scores from the remaining recommenders 112 are normalized and can therefore still be compared.

In addition to normalizing the scores, the normalization engine 120 can also apply weights to the output from each recommender 112. The weights in one embodiment are multipliers that effectively increase or decrease candidate recommendations' normalized scores. Weights may be applied to emphasize the output of certain recommenders 112 over others. Because some recommenders 112 may produce stronger recommendations than others, applying weights emphasizes the stronger recommendations and deemphasizes the weaker recommendations. Moreover, in some embodiments, the weights may be adjusted for each user to reflect the user's preferences. For instance, if a particular user demonstrates an affinity for items selected by a particular recommender, that recommender's selections may be weighted more heavily for this particular user. These weights may also be adjusted over time to reflect the user's changing interests.

In some cases, multiple recommenders 112 will generate the same candidate recommendation. One option in this scenario is to add the scores for the candidate provided by each recommender 112. Adding the scores causes a candidate to appear stronger, indicating that candidates provided by multiple recommenders may be good candidates. A potential problem with this approach is that when two recommenders 112 generate a poor candidate, the addition of the scores makes the candidate look stronger than it should. The normalization engine 120 in one embodiment therefore applies exponential decay to the scores, such that scores for the same item are given exponentially less weight as more recommenders 112 recommend the same item. Other decay functions may also be used, such as linear decay.

The normalization engine 120 passes the candidate recommendations to the candidate selector 130. The candidate selector 130 selects a subset of the candidate recommendations to recommend to the user based on the candidates' normalized scores. For example, the candidate selector 130 may select the N most highly scored candidates to recommend. Alternatively, the candidate selector 130 may select a different subset. For example, in some cases it can be beneficial to show recommendations that are not determined to be the best in order to provide fresh recommendations to the user, among other reasons.

Rather than selecting a subset of the candidate recommendations, the candidate selector 130 may provide the entire set of candidates to the user. Because this set is typically large (e.g., several thousand items), a user interface used to display the recommendations may allow the user to page or scroll through this recommendations set from highest to lowest ranking. Because users commonly do not take the time to scroll or page through the entire set of recommendations, the practical effect is the same as selecting a subset, e.g., the user is only presented with those items falling near the top of the list.

In addition, the candidate selector 130 may output, with the recommendations, associated reasons for recommending the items. As described above, a single reason may be provided for each recommendation, or multiple reasons may be provided.

Figure 2:
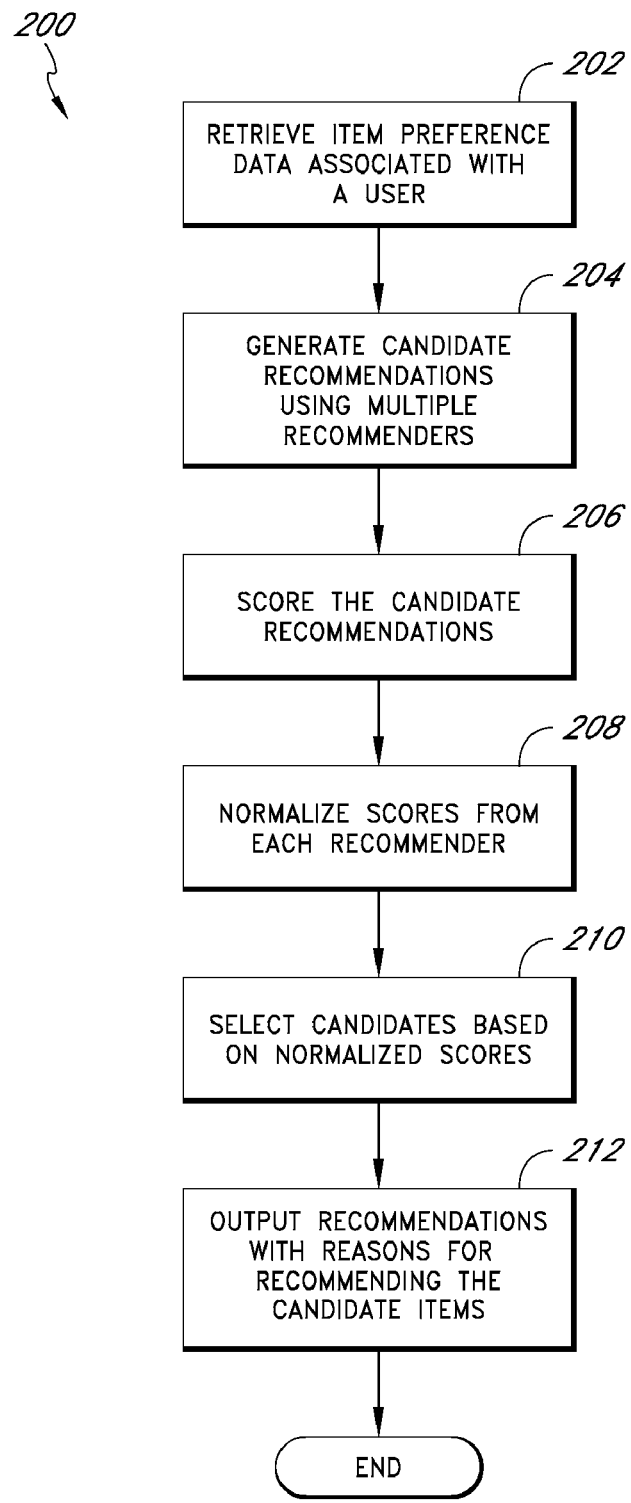
FIG. 2 illustrates an embodiment of a process for generating item recommendations for a user.

FIG. 2 illustrates an embodiment of a process 200 for generating item recommendations for a user. The process 200 is implemented in one embodiment by a recommendation system, such as the recommendation system 100 of FIG. 1.

The process 200 begins at 202 by retrieving item preference data associated with a user. This step may be performed by a recommendation engine, such as the recommendation engine 110 of FIG. 1. At 204, the process 200 generates candidate recommendations using multiple recommenders. In an embodiment, this step is performed by analyzing item preference data to identify one or more reasons for recommending candidate recommendations to a user.

At 206, the process 200 scores the candidate recommendations. This step may also be performed by the recommenders. The scores can provide indications of the relative strength of the candidate recommendations. The process 200 in one embodiment scores candidate recommendations from different recommenders using scoring scales that may be based on factors pertinent to one recommender but not another. In an embodiment, the process 200 also provides negative feedback scores.

At 208, the process 200 normalizes scores from each recommender. This step may be performed by a normalization engine, such as the normalization engine 120 of FIG. 1. The normalized scores enable the candidate recommendations to be more easily compared. In an embodiment, this step further includes the step of assigning weights to the scores provided by the recommenders so that some recommenders may be emphasized over others. Additionally, the process 200 may also normalize scores using an exponential decay function, to reduce the effect of the same item being recommended by multiple recommenders.

At 210, the process 200 selects candidates based on the normalized scores. This step may be performed by a candidate selector, such as the candidate selector 130 of FIG. 1. The process 200 may select a subset of most highly scored candidates to recommend, or alternatively, provide a different subset of the entire set of candidates as recommendations. At 212, the process 200 outputs recommendations with reasons for recommending the candidate items. This step may also be performed by a candidate selector.

Figures 3A, 3B:
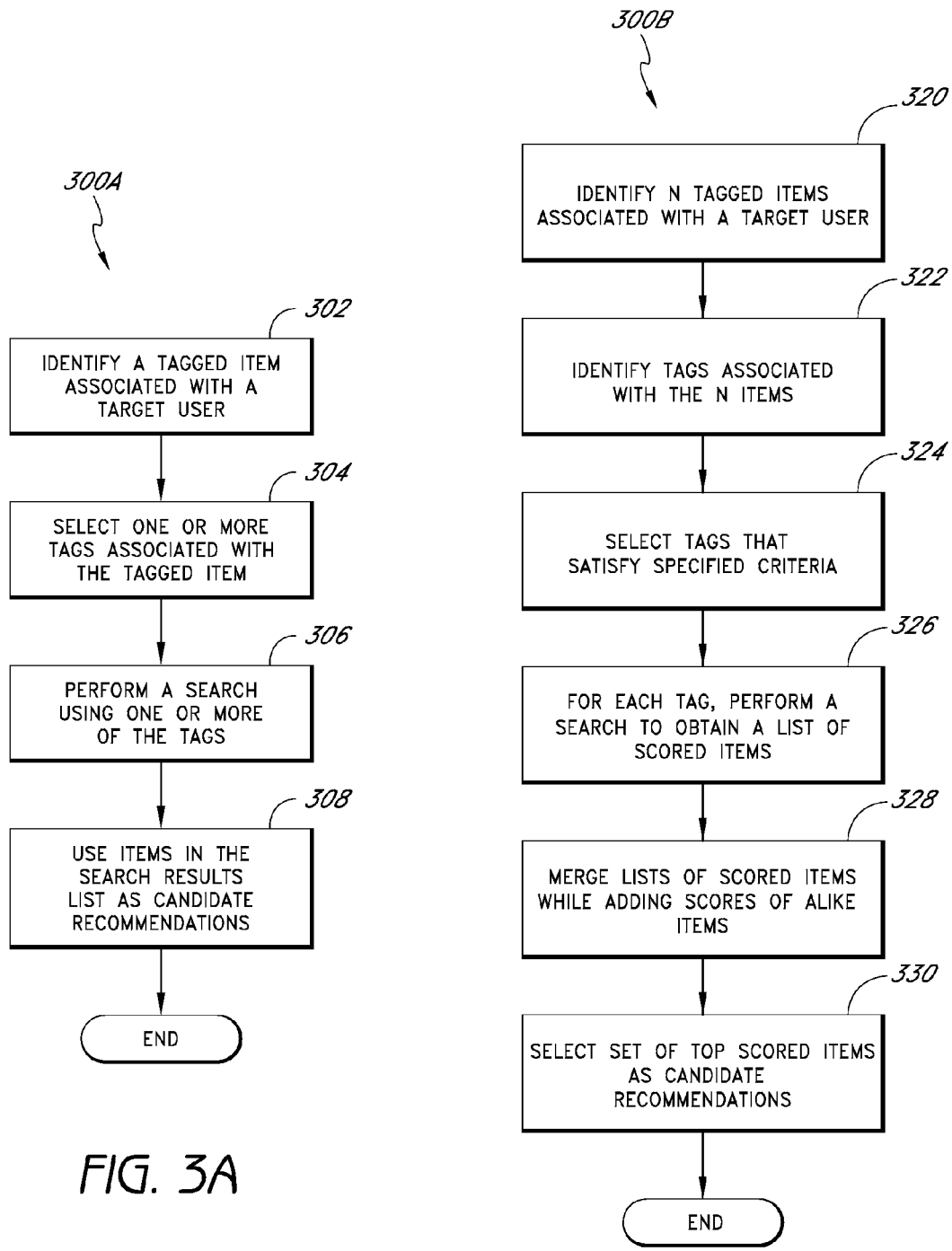
FIG. 3A illustrates an embodiment of a process for generating tag-based item recommendations for a user.
FIG. 3B illustrates another embodiment of a process for generating tag-based item recommendations for a user.

FIG. 3A illustrates an embodiment of a process 300A for generating tag-based item recommendations for a user. The process 300A is implemented in one embodiment by a recommender, such as one of the recommenders 112 of FIG. 1.

Items are tagged in certain embodiments through a user interface that allows users to flexibly apply user-defined tags to individual items in an electronic catalog. The tags may, for example, be in the form of textual annotations or labels that are typed in by users, although other forms of content are possible. The tags and tag-item assignments created by each user are stored persistently in association with the user, and may be kept private to the user or exposed to others. By tagging multiple items with the same tag, a user can flexibly define personal item categories or groupings. For example, a user might create the tag "work" for tagging items relevant to the user's profession, or might create the tag "Tom" for tagging potential items to purchase for a friend or family member named Tom. The users may also have the option to make their tags "public," meaning that these tags are exposed to other users. Further details on how tags are created are described in U.S. patent application Ser. No. 11/281,886, filed Nov. 17, 2005, and titled "Recommendations Based on Item Tagging Activities of Users," the disclosure of which is hereby incorporated by reference in its entirety.

The process 300A begins at 302 by identifying a tagged item associated with, although not necessarily tagged by, a target user. This step is performed in one embodiment by searching item preference data of the target user to find tagged items that the user has purchased, added to a wish list or shopping cart, rated, searched for, or the like. The tags associated with the tagged items need not have been created by the user, although they may have been in some instances. In one embodiment, only public tags are used.

At 304, the process 300A selects one or more of the tags associated with the tagged item. As items can have multiple tags, the process 300A may select the most popular tag, which may be a tag most frequently attached to the item. Alternatively, the process 300A may select other tags, such as the top three most popular tags.

Thereafter, the process 300A at 306 performs a search using one or more of the selected tags. The search results are related to the information contained in the tags. Since the tags describe a product associated with the user, at least some of the search results may include items that the user would find interesting. At 308, the process 300A uses at least some of the items in the search result list as candidate recommendations. The process 300A might score the items, for instance, based on search result relevance scores returned by the search engine. In addition, the process 300A may also provide reasons for recommending the items.

As an example, a user might have purchased a movie in the past starring the fictional character James Bond™. The process 300A can select this movie from the item preference data of the user and determine what tags, if any, are associated with the item. Some possible tags might be "James Bond" and "adventure." The process 300A may then perform a keyword search of an electronic database or catalog using these tags as keywords. The scope of this search may optionally be limited to a particular type of item or collection of items, such as "all products" or "all movies." The search results might include more James Bond™ movies, James Bond™ books, other action or adventure movies, and so forth. Since at least some of these items are probably related to the movie purchased by the user, some or all of these items may be used as recommendations. Additionally, the process 300A may provide a reason for recommending the items that includes a reference to the tag searched on, such as "recommended because you purchased a movie starring James Bond."

FIG. 3B illustrates another embodiment of a process 300B for generating tag-based item recommendations for a user. The process 300B is also implemented in one embodiment by a recommender, such as one of the recommenders 112 of FIG. 1.

The process 300B begins by identifying a number N of tagged items associated with a target user at 320. As described above, the items may be associated with the user through the user's purchases, items added to a wish list or shopping cart, items the user rated, items the user searched for, or the like. In an embodiment, the process 300B identifies all of the items associated with a user. Alternatively, the process 300B identifies a subset of these items, such as items that were more recently associated with the user. By identifying a subset of the items associated with the user in certain implementations, the process 300B can reduce the processing burden on a system implementing the process 300B.

At 322, the process 300B identifies tags associated with the N items. Since each item may have multiple tags, there may be a large number of tags among the N items. From this group of tags, the process 300B selects tags at 324 that satisfy specified criteria. For instance, the process 300B might select a threshold number of the most popular tags, such as the ten most popular tags. Or the process 300B might select all tags that were applied to an item a threshold number of times, such as 3 times.

For each tag, the process 300B then performs a search to obtain a list of scored items at 326. The process 300B does this in one embodiment by sending the tags to a search engine, which performs a search for each tag separately. The search engine returns a ranked list of scored items for each tag searched on. The scores may be based on, for example, the search result scores for each item. In an alternative embodiment, the process 300B performs a search for all of the tags at once, using a logical OR operation.

The process 300B at 328 merges the lists of scored items while adding scores of alike items. Merging the lists of scored items includes re-ranking the scored items according to their search results scores to produce a single ranked list of items. The scores of alike items (items appearing in multiple lists) are added to increase the scores, and hence rankings, of these items.

At 330, the process 300B selects a set of top scored items from the merged list to provide as candidate recommendations. This step can include, for instance, selecting a threshold number of items, such as 10 items, or selecting items having a score above a threshold score.

Figure 4:
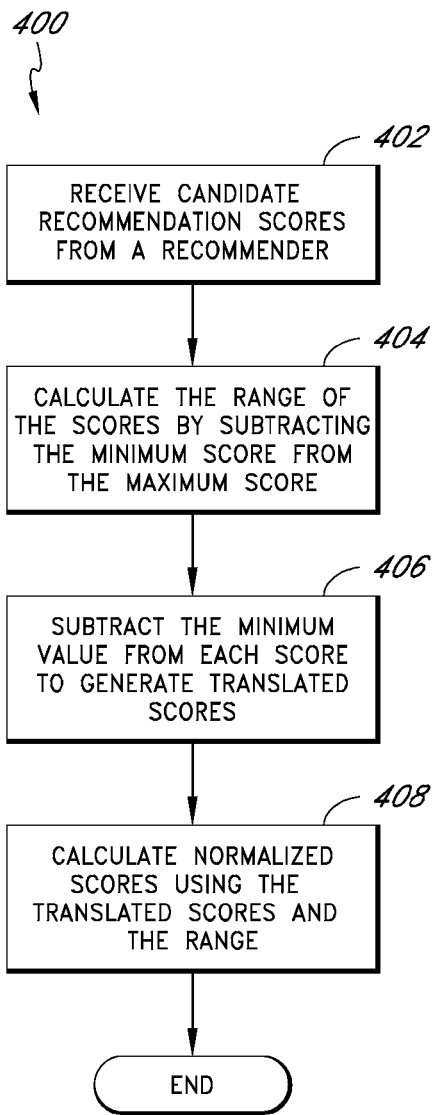
FIG. 4 illustrates an embodiment of a process for normalizing item recommendation scores.

FIG. 4 illustrates an embodiment of a process 400 for normalizing item recommendation scores. The process 400 is implemented in one embodiment by a normalization engine, such as the normalization engine 120 of FIG. 1.

The process 400 begins at 402 by receiving candidate recommendation scores from a recommender. As described above, the scores received from one recommender may differ in scale from scores received from other recommenders. At 404, the process 400 calculates the range of the scores by subtracting the minimum score from the maximum score.

Thus, for example, if the minimum score assigned to a candidate recommendation is 10, and the maximum score is 120, then the range is 120-10, or 110.

Thereafter, the process 400 at 406 subtracts the minimum score value from each score provided by the recommender in order to generate a set of translated scores. This step causes the normalized scores to be less than or equal to 1 after step 408. In some embodiments, this step is optional. At 408, the process 400 divides the translated scores by the range to produce normalized scores. The resulting set of normalized scores in one embodiment ranges from 0 to 1.

The process 400 can be illustrated by an example. Two sets of scores from different recommenders might be as follows: a first set of 1, 3, 5, 2 and a second set of 60, 40, 20, and 10. The range of scores in the first set is 5−1=4, and the range of scores in the second set is 60−10=50. Each score in the sets can be translated by the minimum score to generate translated scores: 1−1=0, 3−1=2, 5−1=4, and 2−1=1 (the new set including 0, 2, 4, and 1); 60−10=50, 40−10=30, 20−10=10, and 10−10=0 (the new set including 50, 30, 10, and 0). The score sets are then divided by the ranges 4 and 50, respectively, to generate normalized scores 0, 0.5, 1, and 0.25 for the first set and 1, 0.6, 0.2, and 0 for the second set. Since the scores from each set lie in the same range, they may be compared. Thus, for example, a candidate selector that chooses the top three items from these score sets would choose the item in the first set having score 1 and the items in the second set having scores 1 and 0.6, assuming that the scores from each set are weighted equally.

As described above, negative scores may be provided by recommenders. The process 400 can also normalize these negative scores. However, when both positive and negative scores are normalized together according to the process 400, the normalized negative scores may be in the range of 0 to 1. Negative scores may therefore have positive normalized scores, eliminating the benefit of adding negative scores to positive scores. In some embodiments, the process 400 overcomes this problem by analyzing negative and positive scores separately. The normalized negative scores can then be subtracted from the positive scores.

In some embodiments, the process 400 normalizes scores dynamically. In one such implementation, which may be used when the scores are normalized in real time or near real-time, the process 400 normalizes the scores using a window, which may be a list or the like. The window might include, for example, a list of 10,000 scores. In one embodiment, the number of scores in the window increases until a maximum number of scores are reached, such as 10,000 scores. Once the maximum number of scores are reached, the window is reset (e.g., by removing the old scores), and the window begins again to receive new scores. In another embodiment, once the maximum number of scores is reached, each new score added to the window causes an old score to be removed.

In some embodiments, the window may not include all of the scores generated by a particular recommender. The minimum and maximum scores provided by the recommender may therefore not be in the window. Accordingly, in certain embodiments, the minimum and maximum scores are generated dynamically as the scores are received into the window.

In one embodiment, the minimum and maximum scores are generated dynamically by determining if a new score inserted into the window is less than a previous minimum score or greater than a previous maximum score. If either of these conditions hold, then the new score is considered to be the new minimum or maximum. An initial guess of the minimum and maximum scores may be provided when the window is first generated or reset. To conserve processing resources, in one embodiment the minimum and maximum are not evaluated for each new score received by the process 400. Instead, the scores are sampled periodically or probabilistically to evaluate for a new minimum or maximum score. Thus, for example, every 100th score may be evaluated to determine if it is a new maximum or minimum. As the number of scores received in the window increase over time, in some embodiments the minimum and maximum scores stabilize or converge. In certain embodiments, if the window is reset, the calculation of minimum and maximum scores restarts.

Recommendation scores may be normalized over multiple computers, servers, processors, processing cores, or the like (collectively, "computing devices") to balance processing loads. However, when windowing techniques are used, differences in normalization can occur among the different computing devices. For example, if the same recommender on different computing devices provides different scores to a normalization engine, the minimums and maximums on these computing devices might be calculated differently. The resulting normalized scores might be inconsistent across the different computing devices.

This inconsistency can undesirably cause different recommendations to be displayed to the same user at different times. Refreshing a web page of recommendations, for instance, can cause a different computing device to generate the recommendations in some embodiments. If the normalization scores are different on each computing device, the refreshed recommendations might be different from the previously-displayed recommendations. These different recommendations may create user confusion and cause user mistrust in the recommendations.

To reduce the effects of this problem, fewer digits of precision may be used to generate the scores, or alternatively, the process 400 may reduce the number of digits of precision in each score. In effect, the process 400 selects a subset of digits used in the scores. Thus, a score of 0.529 might be modified to become simply 0.5. Advantageously, with fewer digits of precision in the scores, the faster the minimums and maximums can stabilize or converge. In effect, variability among the normalized scores on the different computing devices is reduced because common ranges are found more quickly on each server.

Sometimes outliers in a set of scores can skew the distribution of normalized scores. Outliers include scores that are much smaller or much larger than most of the other scores. For example, in a set of scores 1, 2, 5, and 1001, the score 1,001 might be an outlier. Outliers can skew the normalized distribution by affecting the range. In the above example, the range is 1000. Dividing the various scores by this number (after translation by the minimum value) yields normalized scores 0, 0.001, 0.004 and 1. The outlier in this example overwhelmingly dominates the other normalized scores.

Outliers may indicate very strong recommendations and therefore may be desirable to keep. However, when outliers overpower the other recommendations (such as in the above example), it may be desirable to discard the outliers. One way of doing this is to have each recommender remove the outliers. For example, a recommender could set a threshold and remove scores above the threshold (or below the threshold, in the case of low-valued outliers). Another way to remove outliers when dynamic normalization is used is to use the window technique described above, periodically resetting the window. For example, instead of using every score or even a sample of every score to generate minimums and maximums, the minimums and maximums could be reset after a certain number of scores (e.g., after 1000 scores) have been normalized. That way, the impact of outliers is lessened because the reset causes old minimums and maximums to be ignored for future calculations. Yet another way of reducing the impact of outliers is taking the Nth largest (or Nth smallest) score as the maximum (or minimum) score. For instance, the second-to-largest score may be chosen as the maximum score instead of the largest score.

Figure 5:
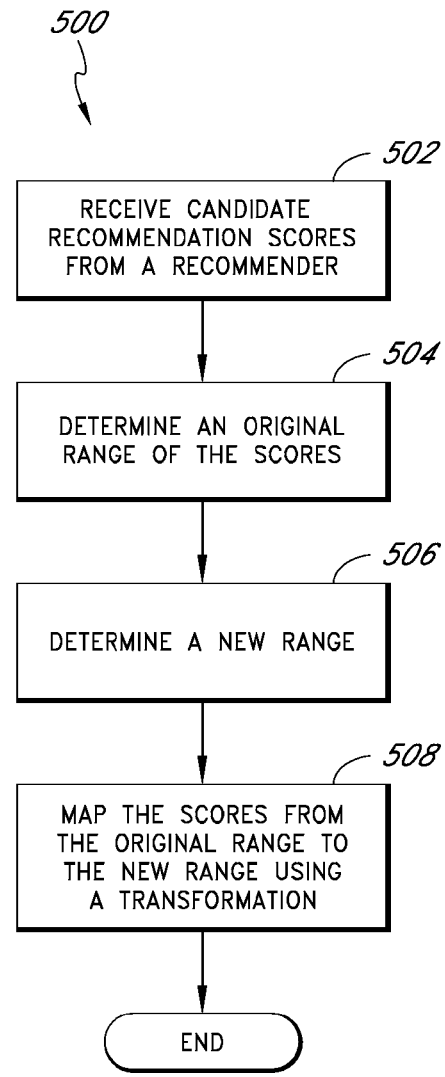
FIG. 5 illustrates another embodiment of a process for normalizing item recommendation scores.

FIG. 5 illustrates another embodiment of a process 500 for normalizing item recommendation scores. The process 500 is implemented in one embodiment by a normalization engine, such as the normalization engine 120 of FIG. 1.

Like the process 400, the process 500 begins at 502 by receiving candidate recommendation scores from a recommender. At 504, the process 500 determines an original range of the scores. This original range may be determined, for example, by subtracting a minimum score from a maximum score. This range may be calculated dynamically using the window techniques described above.

At 506, the process 500 determines a new range. This new range includes a new minimum value and a new maximum value. In one example embodiment, the new range is 0 to 1. Another example range might be −10 to 10. Other ranges may be chosen without limitation.

At 508, the process 500 maps the scores from the original range to the new range using a mathematical transformation. The transformation in one embodiment is a nonlinear transformation. The transformation in certain embodiments takes the form $$\text{Normalized Score} = (\text{Item Score} - \text{Old Min}) * (\text{New Range}/\text{Old Range}) + \text{New Min}, \quad (1)$$

where the Item Scores are candidate recommendation scores, where Old Range=Old Max−Old Min, and where New Range=New Max−New Min. Expression (1) illustrates that for each Item Score, a new score is generated as a function of the Item Scores, the Old Range, and the New Range.

It will be noted that when New Min is 0 and New Range is from 0 to 1, expression (1) becomes $$\text{Normalized Score} = (\text{Item Score} - \text{Old Min})/\text{Old Range}. \quad (2)$$

The normalized scores in expression (2) are computed in the same or a similar manner as the normalized scores of FIG. 4. The minimum value in expression (2) is subtracted from each item score to produce translated scores, which are divided by the range.

Like the process 400, the process 500 can also use the techniques of the process 400 to calculate negative scores, to increase consistency among normalized scores across multiple computing devices, and to minimize the impact of outliers.

Figures 6, 7:
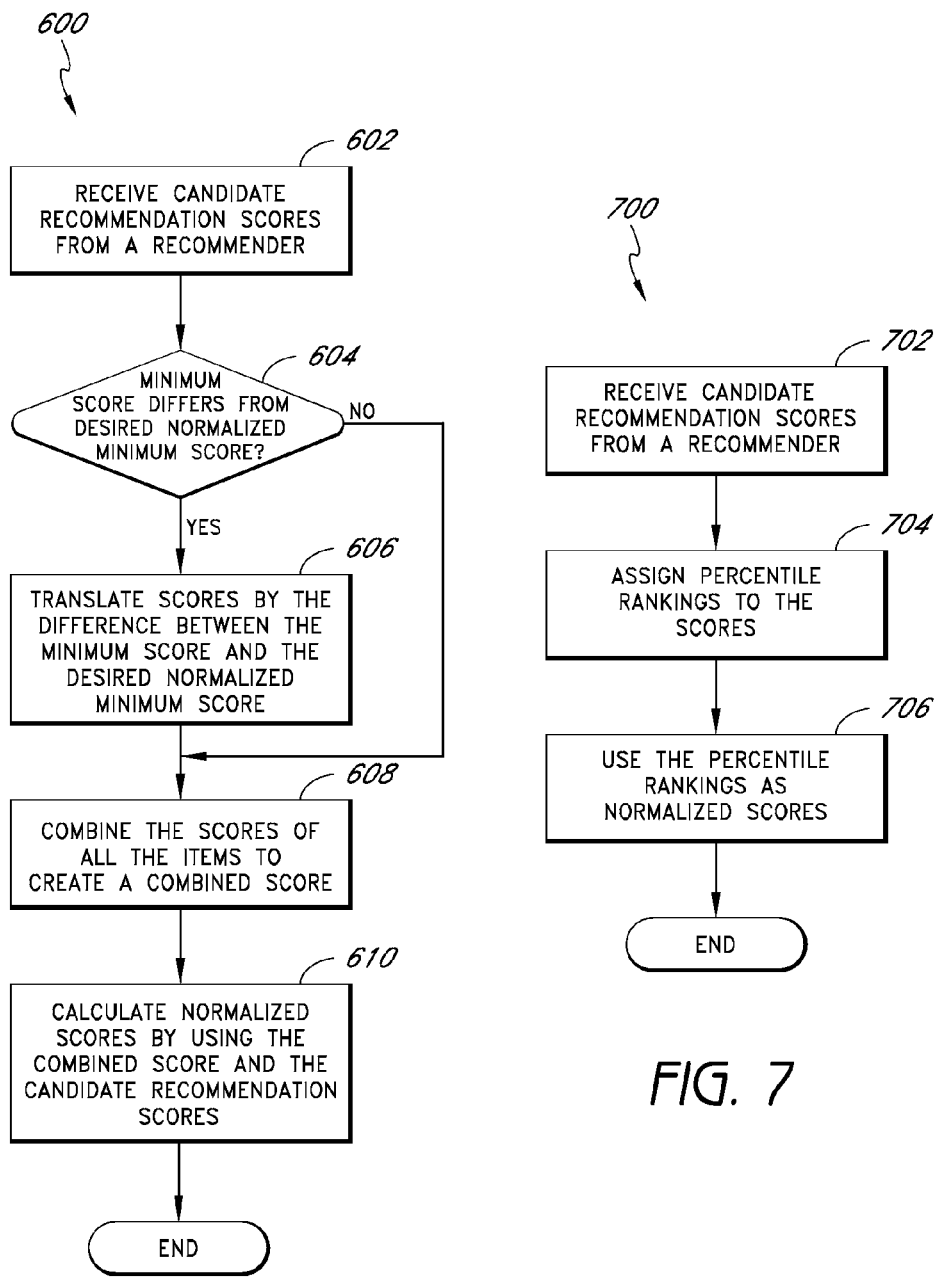
FIG. 6 illustrates yet another embodiment of a process for normalizing item recommendation scores.
FIG. 7 illustrates yet another embodiment of a process for normalizing item recommendation scores.

FIG. 6 illustrates another embodiment of a process 600 for normalizing item recommendation scores. The process 600 is implemented in one embodiment by a normalization engine, such as the normalization engine 120 of FIG. 1.

The process 600 begins at 602 by receiving candidate recommendation scores from a recommender. At 604, the process 600 determines whether a minimum score from the set of received candidate recommendation scores is different from a desired normalized minimum score. The desired normalized minimum score in one embodiment is the value that will be chosen as the minimum score in the normalized range of scores.

If the minimum candidate recommendation score differs from the desired minimum normalized score, the process 600 at 606 translates each score in the set of candidate recommendation scores by a difference between the minimum candidate recommendation score and the desired normalized minimum score. As one example, a set of candidate recommendation scores might have a minimum score of 90 on a scale of 90 to 100. If the desired normalized minimum score is 0, the minimum score and the desired normalized minimum score differ by 90. Accordingly, each candidate recommendation score will be translated (e.g., subtracted) by 90, resulting in a new set of scores ranging from a minimum of 0 to a maximum of 10. Translating the candidate recommendation scores advantageously enables sets of scores from different recommenders having different minimum scores to be more easily compared. After translating the scores, the process 600 proceeds to step 608. If, however, the minimum candidate recommendation score is determined to be the same as the desired normalized minimum score at 604, the process 600 proceeds directly to step 608. In addition, it should be noted that in alternative embodiments, steps 604 and 606 may be omitted.

At 608, the process 600, in certain embodiments, combines the scores of all the items to create a combined score. In one embodiment, combining the scores is done by summing the scores. In another embodiment, block 608 is performed by computing a moving average of a subset of the scores and multiplying the average by the number of scores in the moving average. The moving average may be implemented, for example, by using one or more of the window techniques described above. A moving average can reduce the processing burden on a computing system by reducing the number of calculations to be performed, since the average of all the scores is not computed each time a new score is received. In an embodiment, the moving average is an exponential moving average.

Thereafter, the process 600 calculates normalized scores by using the combined score and the candidate recommendation scores. This step is performed, for example, by dividing each candidate recommendation score by the combined score. In embodiments where the desired minimum normalized score is 0, the normalized scores might range from 0 to 1.

The process 600 may use a window technique, such as described above with respect to FIG. 4, to calculate the minimum candidate recommendation score. Advantageously, the process 600 of certain embodiments can also use the techniques of the process 400 to calculate negative scores, to increase consistency among normalized scores across multiple computing devices, and to minimize the impact of outliers. Additionally, in one embodiment the process 600 also reduces the impact of outliers by periodically resetting a window of scores when window techniques are used. Resetting the window removes the impact of previous outliers. Conversely, the number of scores in the window could be allowed to increase (e.g., the window would be reset at longer intervals), spreading out the affect of outliers on the normalized scores.

FIG. 7 illustrates yet another embodiment of a process 700 for normalizing item recommendation scores. The process 700 is implemented in one embodiment by a normalization engine, such as the normalization engine 120 of FIG. 1.

The process 700 begins at 702 by receiving candidate recommendation scores from a recommender. Thereafter, the process 700 assigns percentile rankings to the scores. In an embodiment, a score's percentile ranking (or equivalently, a candidate recommendation's percentile ranking) reflects the strength of a particular candidate's score. Thus, for instance, a candidate recommendation in the 95th percentile has a score that is higher than 95% of the other candidates' scores. It will be understood, however, that in other implementations the percentile rankings may be used to determine the weakness of a candidate's score. For example, a candidate recommendation in the 95th percentile in this implementation might have a score that is lower than 95% of the other candidates' scores.

The percentile rankings may be assigned in a variety of ways. One way is to calculate the mean and variance values of the set of candidate recommendation scores and use these values to derive the percentile rankings from a normal distribution having the calculated mean and variance. The percentile rankings generated from the normal distribution may be obtained from a lookup table or the like. The process 700 in one embodiment may use a window technique, such as described above with respect to FIG. 4, to calculate the mean and variance values.

Alternatively, the percentiles may be calculated using the following formula:

$$\text{Percentile} = \text{Rank}/\text{Number of scores}. \tag{2}$$

The term "Rank" in expression (2) refers to the numerical position of a candidate score in the set of candidate scores. If, for example, there are 100 candidate recommendation scores and a particular score is the 50th highest score, its percentile is 50/100=0.5. Expression (2) generates percentile rankings ranging from 0 to 1, but the percentiles may alternatively be expressed as percentages (e.g., "50%" or "50th percentile").

In an embodiment, the percentile rankings are generated dynamically using a window of scores, using similar techniques to those described above with respect to FIG. 4. In one such embodiment, the window is implemented as a sorted list of scores, where an old score is removed from the list each time a new score is inserted into the list. Since the scores are sorted, a percentile ranking can be derived from each score's position or rank in the list using, for example, expression (2). For example, the first position in the list might be ranked 1st, the second position might be ranked 2nd, and so on. In an embodiment, the list is sorted automatically as new scores are inserted into the list. The position in the list where the new score is inserted can be determined by searching the list to find the correct position for the new score. In one embodiment, the new score replaces an old score in the same position in the list. Alternatively, the oldest score in the list, regardless of position, is removed from the list when the new score is inserted.

The process 700 at 706 uses the percentile rankings as normalized scores. Advantageously, using percentile rankings as normalized scores reduces the sensitivity of the normalized scores to outliers. As a result, the process 700 may not need to account for unusually low or high scores. Percentile rankings are generally insensitive to outliers because the rankings of successively-ranked scores tend to be independent of the quantitative difference between those scores. For example, a first set of scores 1, 2, and 3 would be ranked the same way as a second set of scores 1, 2, and 100.

The process 700 of certain embodiments can also use the techniques of the process 400 to increase consistency among normalized scores across multiple computing devices. In addition, negative scores may be calculated separately from positive scores, as described above. For items that have only negative scores, the percentile rankings can be reversed, such that an item with a very negative score will have a very low percentile ranking.

Figure 8:
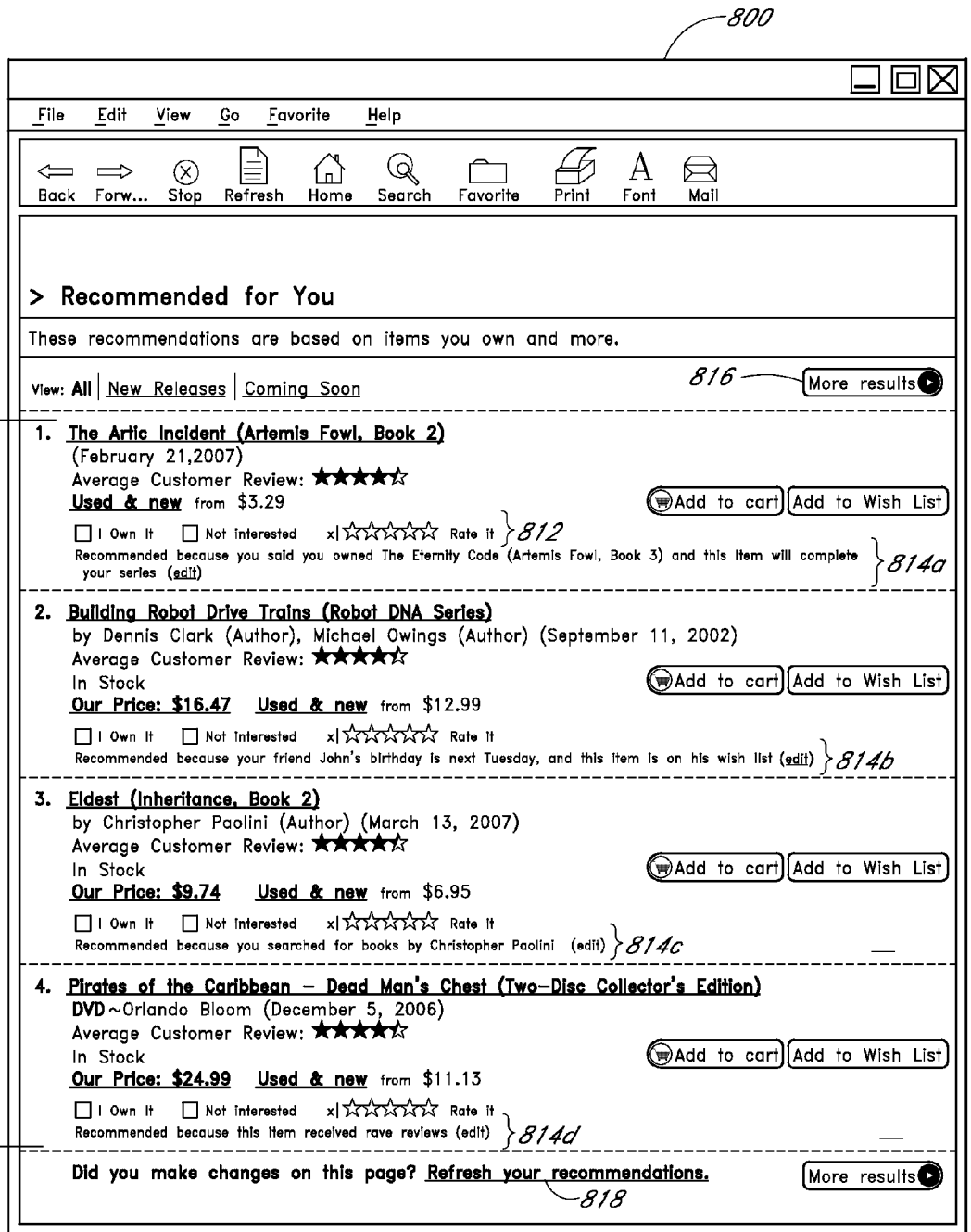
FIG. 8 illustrates a portion of a web page showing an example recommendation interface.

FIG. 8 illustrates a portion of a web page showing an example recommendation interface. The example recommendations page 800 displays recommendations for a user. The recommendations page 800 includes various details about the listed products 810 (four products shown), and includes buttons for adding each product to an electronic shopping cart or wish list. In this example, the recommendation page 800 also includes a set of controls 812 for rating, indicating ownership of, and indicating a lack of interest in, each listed product 810. The recommendations system may use this information and other information to improve the recommendations it makes. In an embodiment, this process is stateless, such that no information about which items have been recommended to which users needs be retained. A refresh option 818 allows a user to see an updated list of recommendations, which may be updated when the user adjusts the controls 812.

One or more reasons 814 are displayed for recommending each item. For example, the item "The Arctic Incident" includes the reason 814a "Recommended because you said you owned The Eternity Code (Artemis Fowl, Book 3), and this item will complete your series." As described above, the reasons 814 provide compelling reasons for recommending items. A user that owns one or more books in the Artemis Fowl series, for instance, might be interested in buying the remaining books in the series.

Figure 9:
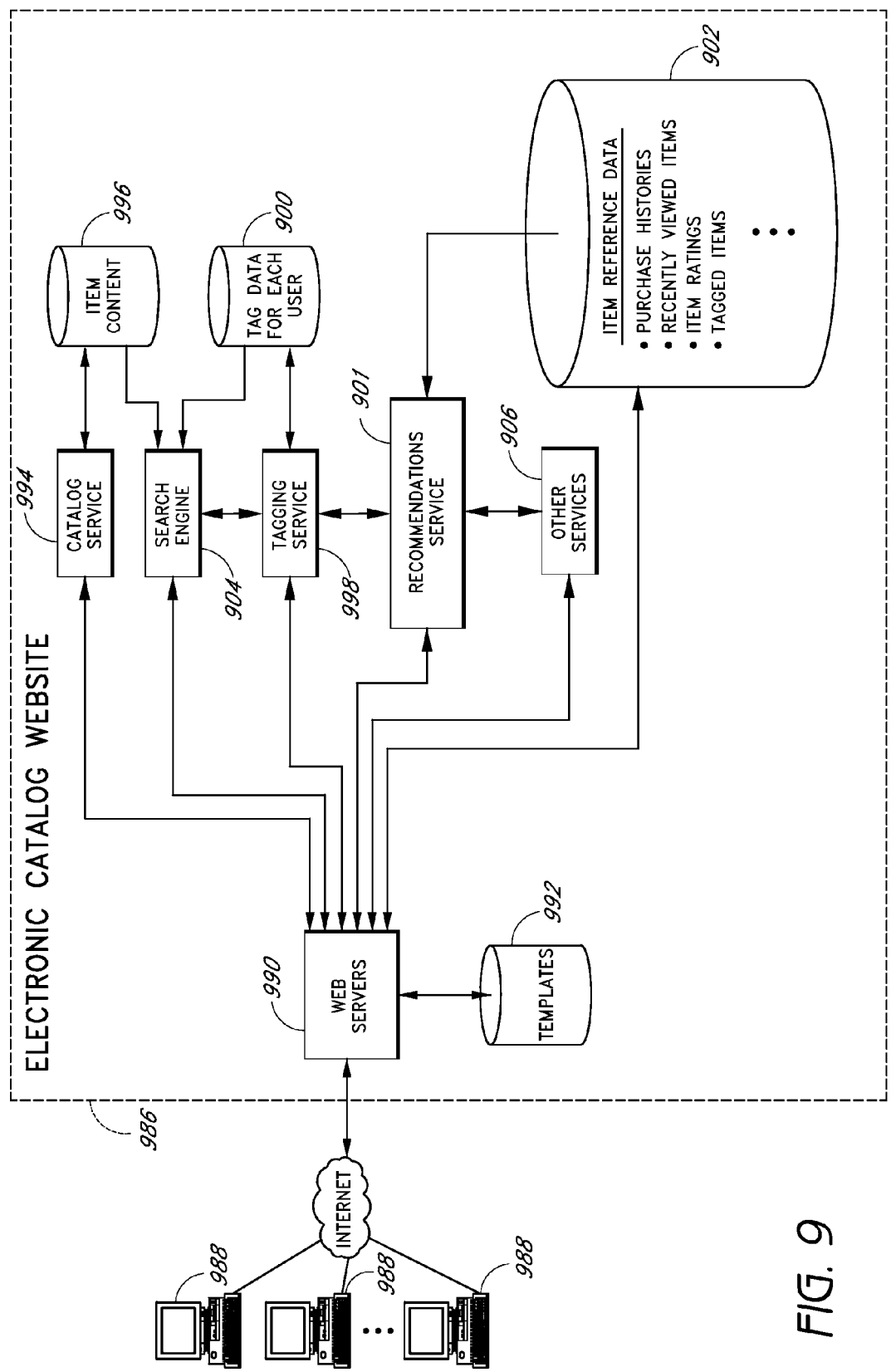
FIG. 9 illustrates one example of how the various recommendation features may be implemented in the context of a web-based electronic catalog system.

FIG. 9 illustrates a set of components that may be included in an electronic catalog website 986 to implement the recommendation functions described above. The system may also include functionality for users to perform various types of item-related actions such as purchasing items, tagging items, adding items to personal wish lists and shopping carts, rating items, reviewing items, etc. The arrows in FIG. 9 show the general flow of information between components. As illustrated by FIG. 9, the system may be accessed by user computers 988 over the Internet. Although shown as personal computers for purposes of illustration, the user computers 988 may include various other types of computing devices, including Personal Digital Assistants (PDAs), wireless phones, set-top television boxes, etc. In the embodiment shown in FIG. 9, the system 986 comprises web servers 990 which process HTTP (Hypertext Transfer Protocol) requests received over the Internet from the user computers 988 that run web browser software. In response to user requests, the web servers 990 dynamically generate content-dependent web pages according to user-specific information. The web servers 990 access a repository of web page templates 992 that specify the layout and format of product detail pages, recommendations pages, and various other types of web pages. The web servers 990 populate these templates with information that is typically dependent upon the identity of the particular user, as may be determined, for example, using browser cookies.

As further illustrated in FIG. 9, the web servers 990 retrieve catalog content for particular products from a Catalog Service 994, which includes or accesses a repository 996 of item content. The item content may, for example, include photos, reviews, price and availability data, and other types of descriptive information about particular products that are available to purchase, rent, download, review, post for sale, etc. via the web site 986.

The web servers 990 also communicate with a tagging service 998 that maintains a database 900 of user-specific tag data. The tag data stored for each user may, for example, include a set of tag-item ID pairs, optionally together with various other types of data such as permission data and a creation timestamp. The tagging service 998 may receive both read requests from the web servers (e.g., when a user requests a page that displays personal tag data), and update requests (e.g., when a user tags an item). In one embodiment, each tag is stored in association with the corresponding user, meaning that if two or more users create identical tags, these tags are treated as separate and distinct from each other. The tags may also be stored in association with one or more items in the electronic catalog.

The web servers 990 also communicate with a search engine 904 that allows users to search for information stored in the item content and tag data repositories 996 and 900. As mentioned above, the search engine may be used to generate recommendations by searching using tags of various items as keywords.

The web servers 990 also access a recommendations service 901 which generates item recommendations. The recommendation service 901 may include multiple recommenders and a normalization engine as shown in FIG. 1 and described above. To request recommendations for a particular user, the a web server 990 sends a request to the recommendations service 901, which responds with a list of recommended items according to the systems and processes described above with respect to FIGS. 1-8. The recommendation service 901 may generate the recommendations in real time in response to a particular user action.

For example, in one embodiment, when a user clicks on a link that invokes the presentation of personalized recommendations, the system generates and returns item recommendations in real time as follows. Initially, a web server 990 sends a request to the recommendation service 901. The recommendation service then responds by invoking some or all of its recommenders 112. The recommenders 112 may, but need not, be invoked in parallel. Each invoked recommender 112 responds by retrieving item preference data 902, which may be distributed over several servers. Each recommender 112 then generates a list of candidate items for the user, together with associated scores and reasons. The normalization engine 120 normalizes the scores as described above, and the candidate selector 130 then uses the normalized scores to select particular candidate items to recommend, and/or to rank the candidate items for display. The recommendation service 901 then returns the ranked list of items and the associated reasons to the web server 990. Finally, the web server 990 uses this information, together with item data retrieved from the catalog service 994 (and possibly other services 906), to generate and return a recommendations page of the type shown in FIG. 8.

Reasons are generated in one implementation by providing several predefined reason types that identify different kinds of reason text. A lookup table or the like may be provided, for example, that maps reason types to reason text. For instance, a reason type "A" might map to the reason text "because you purchased item X," and a reason type "B" might map to the reason text "because item X is on your friend's wish list." In one embodiment, the recommenders 112 pass reason types along with candidate recommendations to the normalizer 120. In turn the normalizer 120 passes the reason types and candidate recommendations to the candidate selector 130, which passes certain recommendations along with their reason types to a user interface component (not shown). The user interface component matches reason types with reason text according to the lookup table and displays the recommendations with the associated reason text to a user (see, e.g., FIG. 8).

In some cases, a particular recommender 112 may not return any candidate items. This may be the case where, for example, the user has not engaged in a particular type of user activity on which the recommender is based, or where the recommender otherwise relies on some type of user data that is not available for the particular user.

The recommendations service 901 also communicates with the tagging service in certain embodiments to obtain tagging data useful for producing recommendations, according to the process 300 described with respect to FIG. 3 above.

The recommendations service 901 also optionally communicates with one or more other services 906, such as a friends service that allows the user to save birthday and interest data about friends.

The web servers 990 also access one or more additional repositories of user data, logically represented in FIG. 9 as item preference data 902. Because a group of individuals can share an account, a given "user" may include multiple individuals (e.g., two family members that share a computer). As illustrated by FIG. 9, the data stored for each user may include one or more of the following types of information (among other things) that can be used to generate recommendations in accordance with the invention: (a) the user's purchase history, including dates of purchase, (b) a history of items recently viewed by the user, (c) the user's item ratings profile, if any, and (d) items tagged by the user. Various other types of user information, such as wish list/registry contents, email addresses, shipping addresses, shopping cart contents, and browse (e.g., clickstream) histories, may additionally be stored.

The various components of the web site system 986 may run, for example, on one or more servers (not shown). In one embodiment, various components in or communicating with the recommendations service 901 are replicated across multiple machines to accommodate heavy loads.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage.

The various features and processes described above may be used independently of one another, or may be combined in various ways. All possible combinations and subcombinations are intended to fall within the scope of this disclosure. In addition, certain method or process steps may be omitted in some implementations.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any of the incorporated-by-reference materials.

What is claimed is:

1. A computer-implemented method of normalizing item recommendation scores, the method comprising:

by a computer system comprising computer hardware:

assigning scores to candidate recommendations with first and second recommenders, the first recommender configured to assign first scores to a first portion of the candidate recommendations, the second recommender configured to assign second scores to a second portion of the candidate recommendations using a different scoring scale than the first recommender;

outputting the scores from each of the recommenders to a normalization engine;

for each recommender, normalizing the scores output by the recommender with the normalization engine by at least:

combining the scores for at least some of the candidate recommendations to generate a combined score, said combining comprising computing a moving average of at least some of the scores, and calculating normalized scores based at least in part on the combined score and the scores for at least some of the candidate recommendations; and using the normalized scores to select at least a portion of the candidate recommendations to recommend to the target user.

2. The method of claim 1, wherein said translating at least some of the scores comprises translating at least some of the scores by a difference between a minimum score and the desired normalized minimum score in response to determining that the minimum score differs from the desired normalized minimum score.

3. The method of claim 1, further comprising adjusting the number of scores combined in the combined score to reduce the impact of outliers on the normalized scores.

4. The method of claim 1, wherein combining the scores for at least some of the candidate recommendations comprises summing the scores.

5. The method of claim 1, further comprising assigning weights to candidate recommendations received from the first and second recommenders.

6. The method of claim 1, wherein calculating normalized scores based at least in part on the combined score and the scores for at least some of the candidate recommendations comprises dividing each candidate recommendation score by the combined score.

7. The method of claim 1, wherein the moving average comprises an exponential moving average.

8. A system for normalizing item recommendation scores, the system comprising:

a system comprising computer hardware, the system programmed to implement:

a plurality of recommendation algorithms, each of the recommendation algorithms configured to: generate candidate recommendations, assign scores to the candidate recommendations, and to output the candidate recommendations and associated scores, wherein at least one of the recommendation algorithms is configured to use a different scoring scale for scoring candidate recommendations than another one of the recommendation algorithms;

a normalization engine operative to normalize the scores output by the plurality of recommendation algorithms, the normalization engine configured to at least:

combine the scores for at least some of the candidate recommendations to generate a combined score by at least computing a moving average of at least some of the scores, and calculate normalized scores based at least in part on the combined score and of the scores for at least some of the candidate recommendations; and a candidate selector configured to select at least a portion of the candidate recommendations to recommend to a target user based at least in part on the normalized scores.

9. The system of claim 8, wherein the normalization engine is further operative to combine the scores for at least some of the candidate recommendations by at least computing a moving average of a subset of the scores.

10. The system of claim 9, wherein the normalization engine is further operative to calculate normalized scores based at least in part on the combined score and of the scores for at least some of the candidate recommendations by at least dividing each candidate recommendation score by the combined score.

* * * * *